United States Patent [19]

Micheron et al.

[11] 4,065,677
[45] Dec. 27, 1977

[54] ELECTRICALLY CONTROLLED SWITCHING DEVICE

[75] Inventors: François Micheron; Gérard Doriath; Eric Spitz, all of Paris, France

[73] Assignee: Thomson-CSF, Paris, France

[21] Appl. No.: 643,645

[22] Filed: Dec. 23, 1975

[30] Foreign Application Priority Data

Dec. 27, 1974    France .................. 74.42640

[51] Int. Cl.² ............................................ H01H 1/04
[52] U.S. Cl. .................... 307/112; 200/181; 350/269
[58] Field of Search .................... 307/116, 117, 88 ET, 307/181, 112, 88; 340/365 C; 317/DIG. 2, 144, 262 F; 178/DIG. 10, 7.3 D, 7.6, 7.7; 179/111 E; 200/181; 350/269

[56] References Cited

U.S. PATENT DOCUMENTS

| | | | |
|---|---|---|---|
| 3,529,897 | 9/1970 | Pfaffenberger | 350/269 X |
| 3,553,364 | 1/1971 | Lee | 178/7.3 D |
| 3,942,029 | 3/1976 | kawakami et al. | 179/111 E |

OTHER PUBLICATIONS

IBM Technical Disclosure Bulletin, Electrostatic Light Switch, Callahan, vol. 12, No. 6, Nov. 1969, 200-181.
R. A. Jones, "Electrostatic Device," IBM Tech. Disclosure, vol. 6, No. 4, Sept. 1963, (317-144), p. 134.

*Primary Examiner*—James R. Scott
*Assistant Examiner*—Morris Ginsburg
*Attorney, Agent, or Firm*—Cushman, Darby & Cushman

[57] ABSTRACT

The invention relates to electrically controlled switching devices in which a movable member can occupy at least two stable positions. The invention has for its object to provide a switching device in which the movable member is a dielectric body having received a persistent electric charge. This body can occupy stable positions defined on an insulating support by conductive pads. The switching is produced by a potential difference applied between the conductive pads.

14 Claims, 11 Drawing Figures

ELECTRICALLY CONTROLLED SWITCHING DEVICE

The present invention relates to electrically controlled switching devices comprising a movable member capable of occupying at least two stable positions. Such devices are used either for storing and/or displaying data or as a means for switching an electric current, electromagnetic radiation or a fluid stream.

In this field, there exist many electromagnetic apparatus in the operation of which there is employed an electromagnet capable of attracting a movable magnetic armature. Some of these operate in accordance with the electrodynamic principle. All such apparatus comprise relatively costly magnetic materials; their manufacture is complex and in many cases an appreciable amount of electric energy is consumed in maintaining one of the stable positions.

In order to obviate these disadvantages, it is proposed in accordance with the invention to use as the movable member of a switching device a dielectric body which carries a permanent electric charge. This member is mounted in an insulating frame provided with conductive pads which simultaneously ensure that the movable member is maintained in the required stable positions without any consumption of energy. These pads serve, with the aid of a transient electric excitation, to cause the movable member to pass across the gap between them.

In accordance with the present invention, there is provided an electrically controlled switching device comprising a frame, and a movable member adapted within said frame for occupying at least two stable positions; said movable member comprising a dielectric body carrying a permanent electric charge; said frame being provided with at least two distinct electrically conductive pads for causing said movable member to be retained, by electrostatic influence, in any one of said stable positions; electric bias means being connected to the said conductive pads for causing said movable member to switch across the gap separating said conductive pads.

For a better understanding of the present invention, and to show how the same may be carried into effect, reference will be made to the following description and the accompanying drawings, among which:

FIG. 11 is an isometric view of a further constructional variant.

The essential constituent of the switching devices according to the invention is a dielectric material carrying a permanent electric charge, which will be referred to as an "electret". There can be obtained by corona discharge from a sheet of dielectric such as polypropylene, for example, a persistent charging which is confined to the neighbourhood of the faces. Such an electric charge deposit may be eliminated by rubbing the charged face with a solvent, but apart from this action of elimination by removal of substance, the charged material is capable of lastingly retaining its charge. When one of the faces of a dielectric foil has been charged in order to form an electret, it is found that when this charged foil is deposited upon an electrically insulating substrate it can freely slide without being inhibited in its movement by electrostatic forces. On the other hand, if the charged foil encounters an area of the substrate which has been rendered electrically conductive by the deposition of an appropriate material, it is found that it tends to adhere to this area. The conductive deposit having been charged by influence, electric charges of opposite sign to those of the electret member set up an electrostatic attraction which retains the member in the conductive area.

Figure 1:
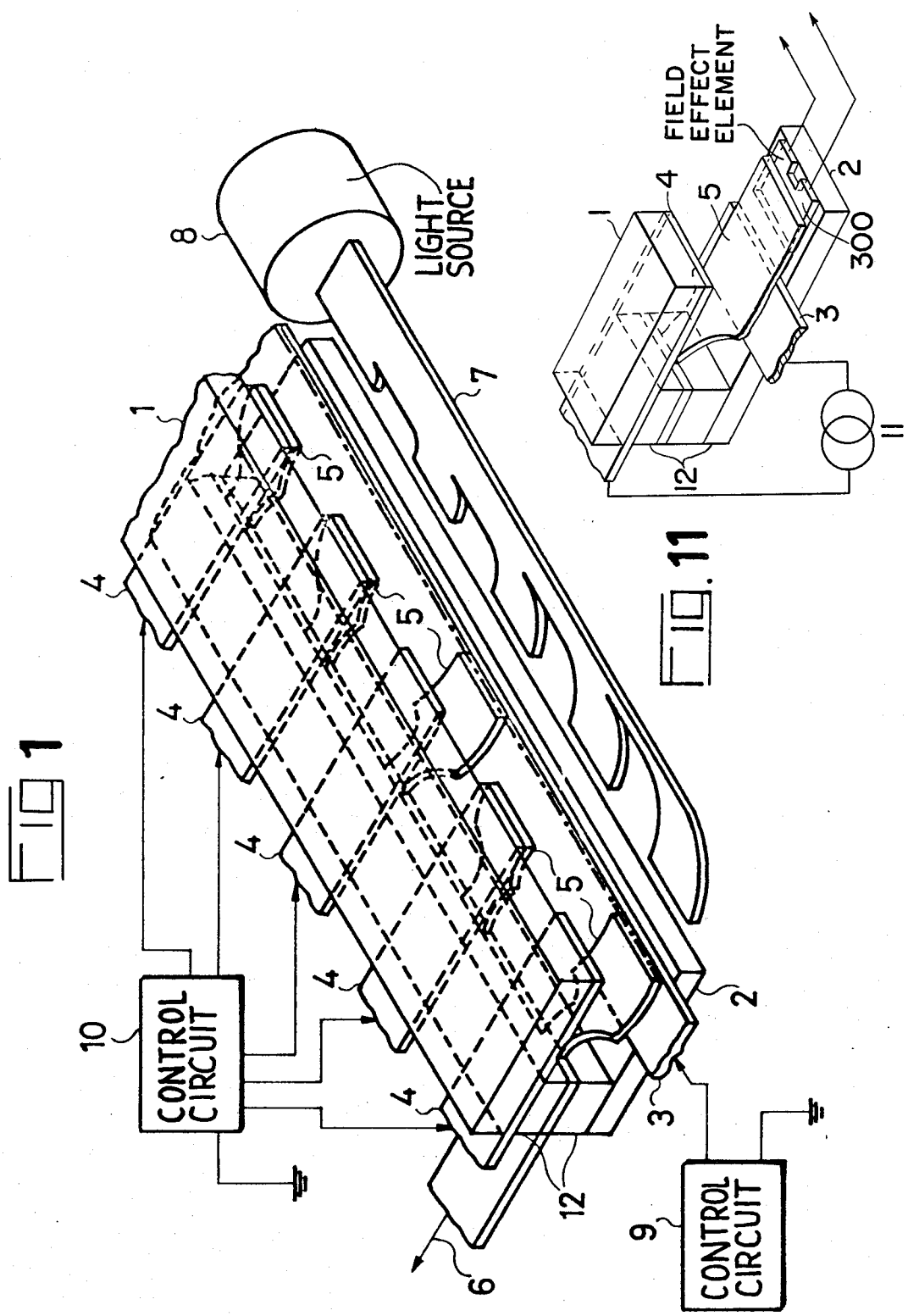
FIG. 1 is an isometric view of a first form of construction of the device according to the invention.

In FIG. 1, there may be seen a device for switching optical radiation which may comprise a large number of cells, but which has been limited to five for the convenience of the drawing. This device comprises an insulating frame formed of two support plates 1 and 2, between which a gap is maintained by means of spacers 12. The lower support plate 2 carries a conductive strip 3 connected to an electric excitation generator 9. The upper support plate 1 carries a grating of conductive strips 4 which are respectively connected to the corresponding outputs of an electric excitation generator 10. The strip 3 and the strips 4 form in general the row and column electrodes of a matrix arrangement of which only a fragment is illustrated in FIG. 1.

At the crossings of the electrodes 3 and 4, there are disposed in the gap between the plates 1 and 2 a set of five flexible lamellae 5 which are clamped at one of their ends between the spacers 12. The end of each lamella 5 opposite the clamped end has received a permanent charging so as to form an electret which, by reason of the flexibility of the lamellae, causes the latter to adhere either to the electrode 3 or to one of the electrodes 4. In the case of an optical switch, the lamellae 5 are cut from a dielectric material capable of propagating the electromagnetic radiation to be switched. The latter is supplied by a source 8 provided with a feeder 7 operating as a distributing guide.

The distributing sections of the feeder 7 extend very close up to the free ends of the lamellae 5 when the latter occupy the lower position, but for the sake of the clarity of FIG. 1 the rack 7 has been shown spaced away from the lamellae 5. Each lamella 5 is provided with an extension 6 which serves to transmit the radiation which it picks up in the lower position from the feeder 7. When a lamella 5 is in the upper position, the optical connection with the feeder 7 is broken, but a second feeder could readily be provided to establish optical connections with the lamellae 5 in the upper position. It would also be possible for the optical radiation which is to be switched to enter by way of the extensions 6 and to be collected either by feeder such as 7 or by systems of elemental guides which form extensions of the lamellae 5 both in the upper position and in the lower position.

Figure 2:
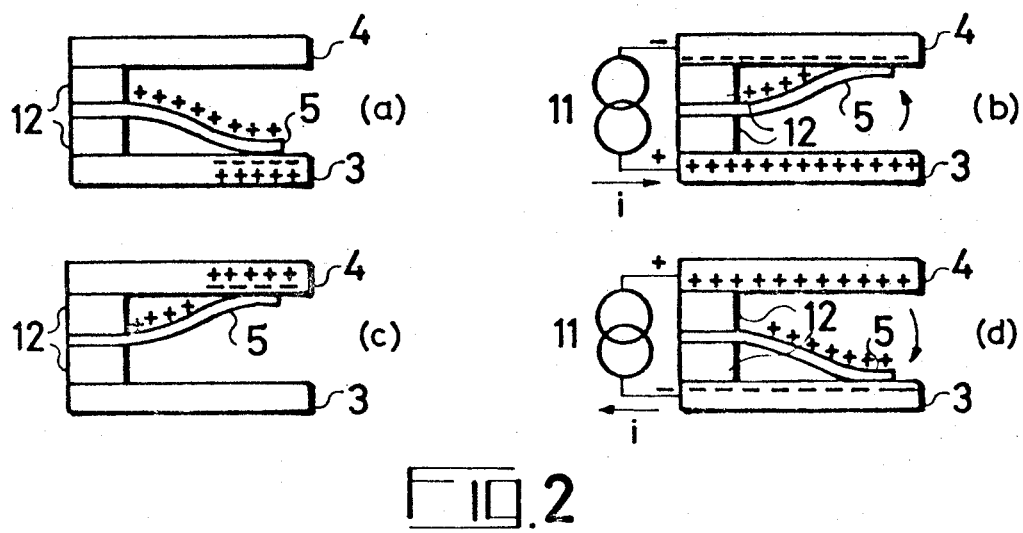
FIG. 2 is an explanatory figure.

The triggering of the lamellae 5 may be understood by reference to the diagrams of FIG. 2, which illustrate, with the same references, at (a) the initial state of a lamella 5 in the lower position, at (b) the switching phase under the control of an electric generator 11, at (c) the state of maintenance after the triggering, and at (d) the reverse switching phase by which the lamella 5 is returned to its initial state:

It will be seen from FIG. 2 (a) or (c) that the maintenance of the lower or the upper position does not require any electrical excitation and that it is due, in the case of a positively charged electret, to the displacement by influence of the free charges in the closer electrode 3 or 4. It will be seen from FIG. 2(b) or (d) that the rocking is effected by a transient application of positive and negative charges supplied by the circulation of the current i. Since these charges are set in motion by the generator 11, it will be seen that the attraction exerted on the lower face of the lamella 5 is passed to the upper face or vice versa. If $\sigma$ is the surface charge density displaced by influence, the electrostatic pressure for the maintenance of the lamella is equal to $p = \sigma\ 2/2\ \epsilon$, where $\epsilon$ is the permittivity of the dielectric of which the lamella consists.

If S is the surface of contact of the lamella with one of the electrodes, the electrostatic retaining force is $f =$ S.p. In practice, the rocking of the lamella 5 is effected by means of an applied charge lower than $\sigma$.S, because in the case of a lamella working in flexure, there exists a mechanical restoring force $f_r$ acting in the opposite direction to the electrostatic maintaining forces f. For each stable state, it is necessary for $f_r$ to be appreciably lower than $f$, whereby the mechanical and geometrical characteristics of the lamella are fixed from a charge density available on the surface of the electret. It is to be noted that the elastic restoring force has an accessory function and that it could equally well consist of a gravitational or frictional force. If the inter-electrode electric capacitance C of each switching cell is known, the voltage V necessary for obtaining the application of charge producing the switching can readily be calculated. Since the rocking is a transient effect, there is only required a voltage pulse whose amplitude V and whose duration T are such as to bring about the detachment of the lamella and its transit between the two electrodes;

By way of non-limiting example, the device of FIG. 1 can be produced by cutting the lamellae 5 from a sheet of polypropylene having a thickness of twelve microns. This sheet is previously electrically charged by corona discharge so as to produce a charge density of the order of $10^{-9}$ coulombs per square centimeter? The lamellae are rectangular and have a width of 4 millimeters with an overhang of 10 millimeters; The electrodes employed are disposed 1.5 millimeters apart. A voltage pulse of about 400 volts applied for 1.5 milliseconds is sufficient to produce the rocking of the electret lamella having these characteristics.

It will be noted that the capacitance C of each cell, formed by the crossing of an electrode 3 with an electrode 4, is of the order of one picofarad. The peak rocking current is of the order of 0.5 microampere and the electric power involved is of the order of 200 microwatts.

Figure 3:
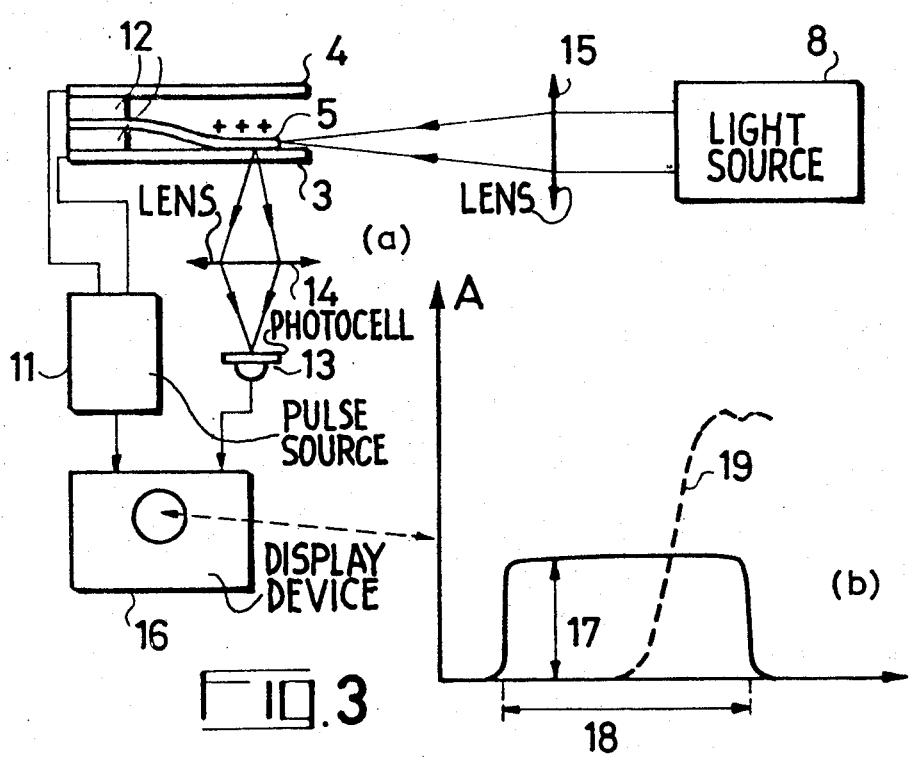
FIG. 3 illustrates an experimental arrangement from which there may be seen the operating characteristics of a device according to the invention.
Figure 4:
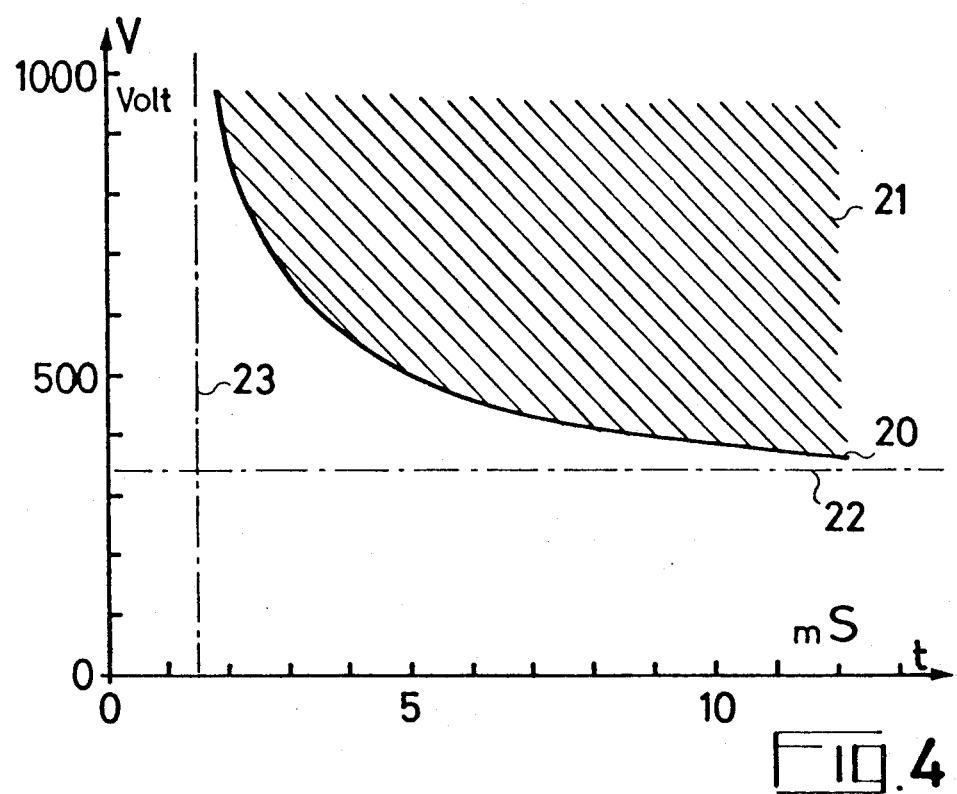
FIG. 4 is an explanatory diagram.

There may be seen in FIG. 3 at (a) an experimental arrangement by means of which it is possible to study the switching characteristics of a cell such as that illustrated in FIG. 1. It comprises a light source 8 associated with a lens 15 which illuminates edgewise the free end of the lamella 5 when the latter is in the lower position. The electrodes 3 and 4 consist of tin oxide and are connected to a pulse generator 11 which supplies a positive voltage at one of its two outputs and a negative voltage at the other. The electrodes 3 and 4 are connected to the frame of the generator 11 via its internal resistance, so that, by alternate initiation of the electric excitation at the two outputs provided, there are obtained the bias conditions illustrated at (b) and (d) in FIG. 2 In order to render visible the two stable states of the lamella 5, it is possible to detect the existence of a light radiation transmitted in the extension 6 of the lamella 5. In fact, there has been chosen in FIG. 3 (a) a lateral detection mode. For example, the image of the movable end of the lamella 5 is formed on a photo-detector 13, a lens 14 being employed for this purpose. The radiation which has penetrated into the lamella 5 is scattered by foreign corpuscles included in its volume and by surface scoring. This effect can be systematically accentuated, for example by sand grinding or by incorporation of diffusing grains in the material from which the lamella 5 are made. With a double-trace oscilloscope 16, it is possible to display as shown at (b) in FIG. 3, the triggering pulse of duration 18 and of amplitude 17 and also the curve 19 indicating the change of position of the lamella. With the arrangement of FIG. 3 it is possible to construct the diagram of FIG. 4, on which the duration of the triggering pulses has been plotted along the abscissae and the amplitude of these pulses along the ordinates. The pairs of values which are just sufficient to produce the switching are located on the curve 20. This curve has two asymptotes 22 and 23 and has the form of a branch of a hyperbola. The hatched area 21 contains the amplitude-duration pairs which bring about the switching with certainty. At a sufficient distance from this area, the switching cannot take place.

The switching cells of FIG. 1 may be arranged in matrix form with N rows and M columns. By applying to a row electrode 3 a pulse which does not in itself bring about the switching and applying to the column electrodes 4 pulses, some of which have a cumulative effect with the row pulse, the selective switching is effected along this row. It is possible to make the row and column pulses coincide in time by giving them amplitudes which cause the switching only when their amplitudes are added at a crossing. It is also possible to choose row and column pulses which bring about the switching only when they coincide in time. Any satisfactory mode of excitation is characterised by two operating points which are clearly distinct from one another, one being located in the zone 21 of FIG. 4 and the other outside this zone. By manipulation of the sign, the amplitude, the duration and the time spacing of the control pulses, many modes of excitation may be envisaged.

Figure 5:
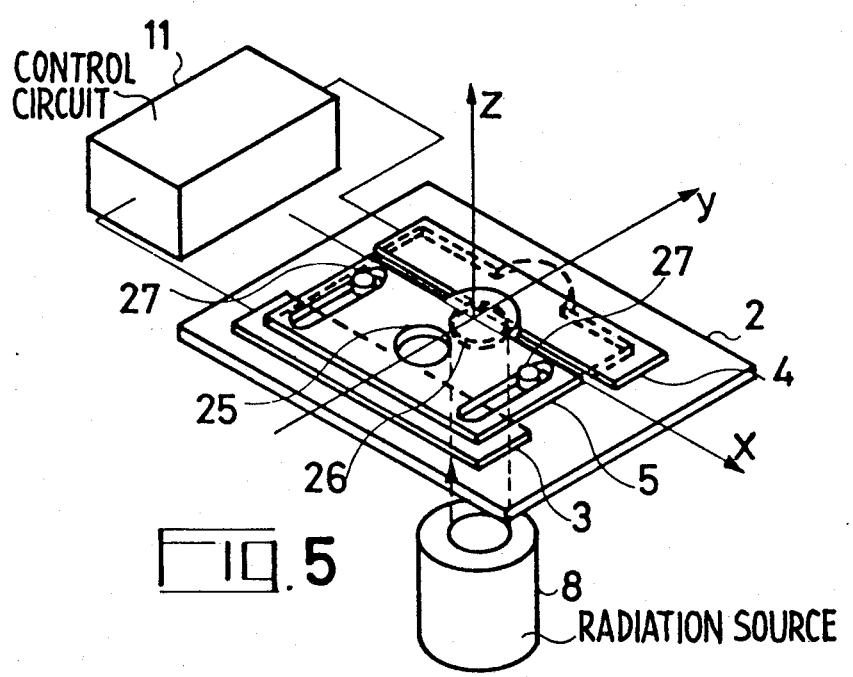
FIG. 5 illustrates a first variant of the construction of the device according to the invention.

In FIG. 5, there is illustrated a modified form of construction of a switching cell according to the invention. This cell differs from that of FIG. 1 in that the electret 5 is here a lamella which is not subjected to flexure, but which can slide along the support plate 2. For this purpose, the electret lamella 5 is formed with lateral guide slots in which are projecting studs 27 fastened to the support plate 2. The electrodes 3 and 4 are deposited upon the support plate 2, but all or part of these electrodes could be located on the other support plate 1, which has been omitted from the drawing for the sake of clarity. Of course, the switching of the electret lamella 5 is here a translational sliding in the direction y. The two positions of maintenance correspond, one to the solidlined drawing of the lamella 5 which partially overlaps the electrode 3, and the other to the chain-lined drawing which indicates overlapping of the electrode 4. The switching mode illustrated in FIG. 5 is optical. The support plate 2 is formed with an aperture 26 which is illuminated by the radiation source 8. The electret lamella 5 is formed with a similar aperture 25. In one of the maintenance positions, the aperture 25 may coincide with the aperture 26.

If, for example, the support plate 2 and the lamella 5 are opaque, the whole arrangement behaves as a light valve. It is also conceivable for the lamella to be transparent and for the aperture 25 to obtain a light diffuser, a lens or a prism. In such cases, the incident radiation is diffused, concentrated, deconcentrated or deflected.

Likewise, instead of the application of an optical radiation to the device of FIG. 5, its switching action may conceivably be exerted on an incident stream of gas in order to divert it or to modulate its rate of flow.

Without departing from the scope of the invention, the device of FIG. 5 may operate with two degrees of freedom. In this case, the lamella 5 consists of an electret wafer whose displacements in the directions $x$ and $y$ are limited by a frame of quadrilateral form. On the four sides of the frame, there are provided four electrodes which define four positions of maintenance of the electret wafer and which, when electrically excited in pairs, permit an independent rocking in the direction $y$ or $x$.

Figure 6:
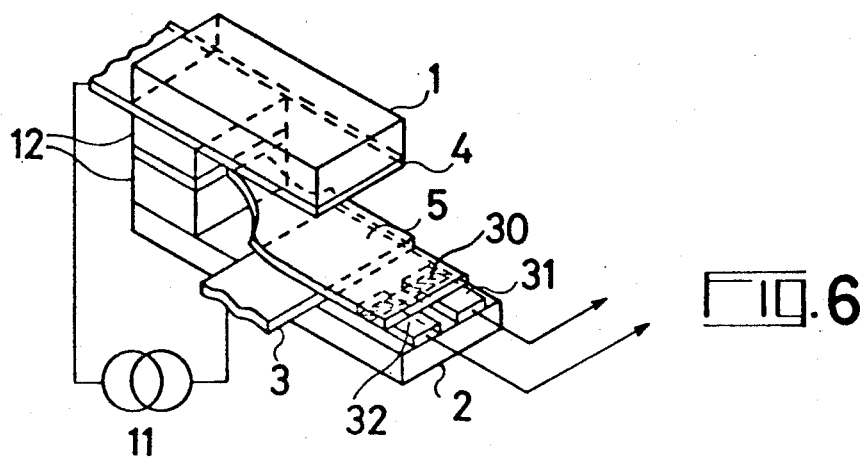
FIGS. 6 and 7 are isometric views of other constructional variants.

There may be seen in FIG. 6 a switching cell comprising an electret, by means of which an electrical contact can be established.

There is disposed on an extension of the movable element 5 of a conductive strip 30 which, when in the lower position, can establish contact between two conductive pads 31 and 32 which are disposed on the support plate 2. Similar means may also be provided on the support plate 4. As shown in FIG. 11, there may be substituted for the pads 31 and 32 the ohmic contacts of a field effect transistor 300, for example of the enhancement mode. When the charged end of the lamella 5 moves towards the transistor, a conductive channel is induced in the substrate between the ohmic contacts, without any control grid or bias source having to be provided. A solid-state device of the avalanche type may also be envisaged for occupying the place of the contacts 31 and 32 and selectively reacting on the electric field developed by the movable end of the electret 5.

Figure 7:
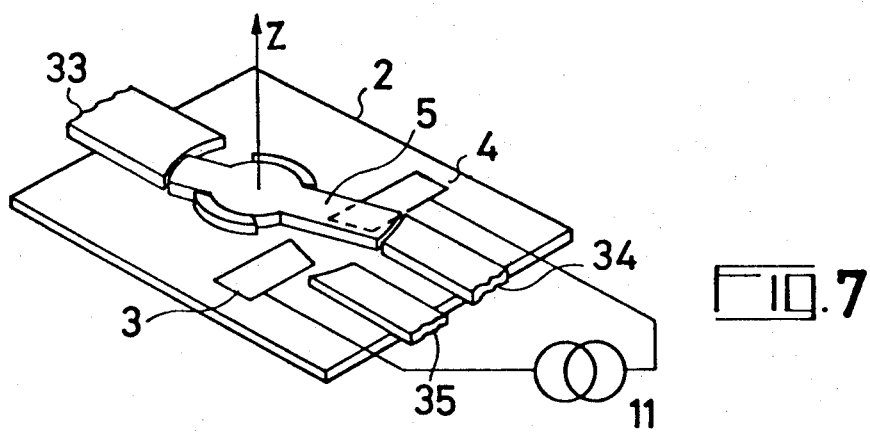

In FIG. 7, there may be seen a switching cell comprising an electret, in which the switching element 5 can pivot about an axis $z$. The same references are used as in the preceding figures, except in regard to the optical wave guides 33, 34 and 35. The arm 5 can occupy two angular positions in which it effects the coupling of the guide 33 with one or other of the guides 35 and 34. Pivoting is controlled by the electric excitation of the conductive pads 3 and 4. The centering and the limitation of travel are effected by two angular segments fast with the support plate 2.

Figure 8:
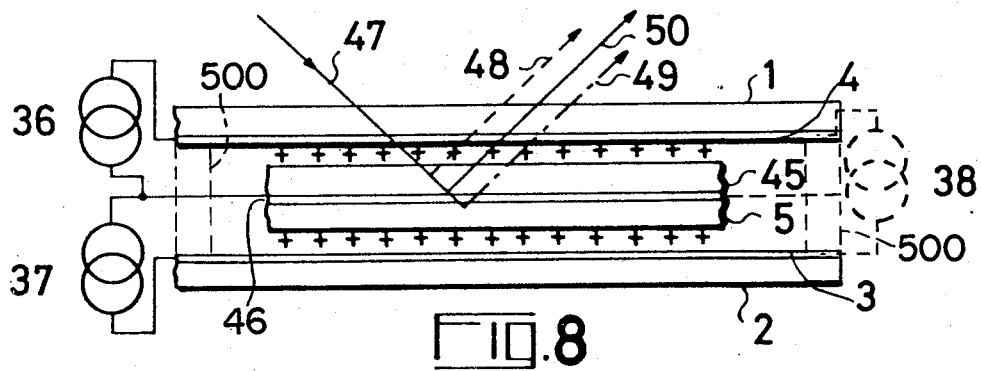
FIG. 8 is a sectional view of a bistable device comprising a reflective coating.

Another arrangement of the switching device according to the invention is illustrated in section in FIG. 8. This device utilises two electret lamella 5 and 45 whose uncharged faces are adjacent to a reflecting layer 46. This movable unit 5, 45, 46 can occupy an upper position or a lower position between two support plates 1 and 2 provided with conductive layers 4 and 3 respectively. The electric excitation intended to produce the rocking is supplied by two pulse generators 36 and 37 or by a single generator 38. If the support plate 1 and the electrode 4 are transparent and if the electret lamella 45 is also transparent, it will be seen that the device can be used to reflect an incident radiation 47 in a direction 50, but with a translational movement of the reflected beam between the positions 48 and 49. If the movable unit is flexible and mounted between two bearing members 500, the deformation which it undergoes in curving towards one support plate or the other makes it possible to vary the vergence of the reflecting wafer 46.

In the foregoing embodiments, the switching takes place between two maintenance positions defined by two electrodes fixed to an insulating frame.

Figure 9:
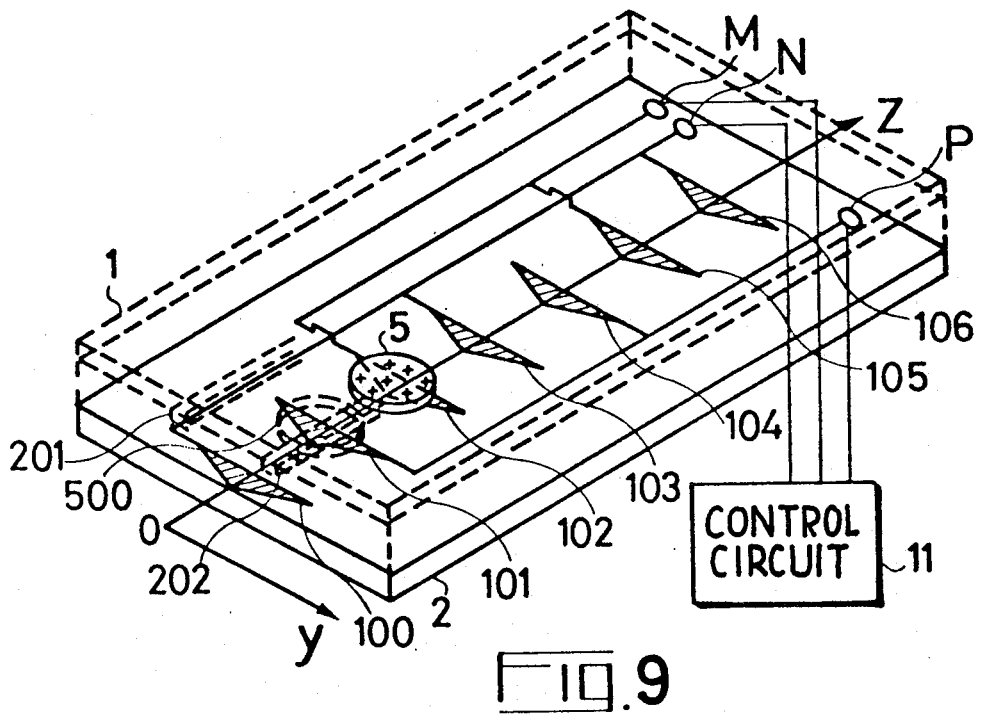
FIG. 9 is an isometric view of a device having more than two stable positions.

There may be seen in FIG. 9 a switching device in which the number of maintenance positions is not limited to two. It comprises an insulating frame having two support plates 1 and 2, between which an electret wafer 5 can circulate. For the sake of the clarity of the drawing, the support plate 1 has been drawn in chain lines and it will be seen that it may be provided with bosses 201 and 202 which guide the wafer 5. A similar guiding effect can be obtained with a thin conductive strip deposited upon the support plate 1, because in this way the wafer 5 is automatically centered by electroastic attraction.

Figure 10:
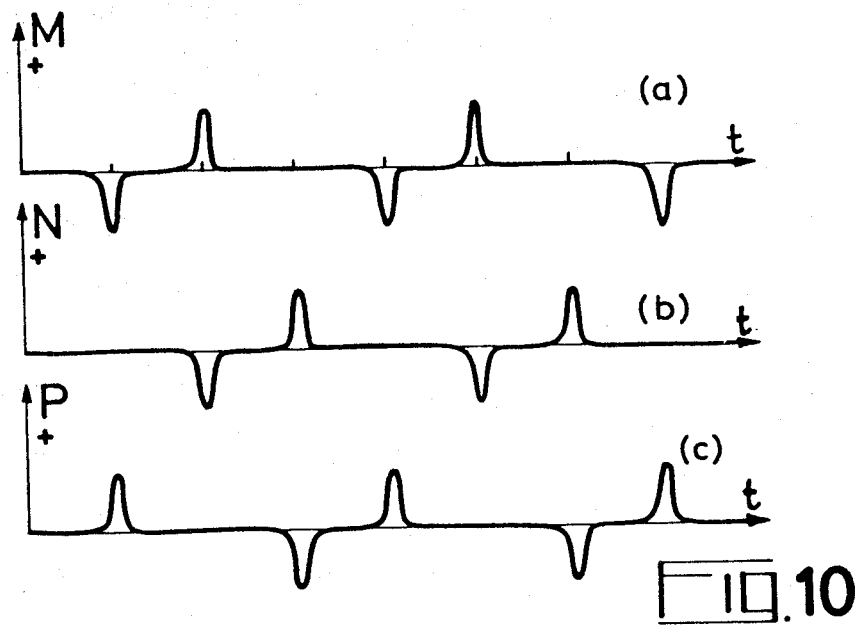
FIG. 10 is an explanatory diagram.

The support plate 2 is provided with a series of conductive pads 100, 101, 102, 103, 104, 105 and 106 which define an equal number of positions of maintenance of the electret wafer 5. For causing the wafer 5 to pass from one position of maintenance to the other, the pads 100 to 106 are connected to three terminals M, N and P, which are electrically excited by electric pulses supplied by the generator 11. In FIG. 10, the control signals applied to the terminals M, N and P are denoted by ($a$), ($b$) and ($c$) respectively.

It will be seen that when the wafer 5 is in a position 500 in which it is retained by the pad 101, a negative pulse must be applied to the terminal M and a positive pulse must be applied to the terminal P in order to bring the wafer into a position above the pad 102 (it has been assumed that the wafer 5 carries a positive charge). The terminal N is not under voltage during this control phase. It will thus be seen that the pads 100 and 103 have no electrostatic action on the wafer 5 and that they protect it from the remote electrostatic actions of the pads situated externally of them. The displacement of the wafer 5 is therefore dependent upon the pads 101 and 102 and is limited to passing across an inter-pad gap. In the diagrams of FIG. 10, this phase is marked by the earliest pulse emission on the time scale t. The following stage in which the wafer 5 is moved from the pad 102 to the pad 103 requires the application of a positive pulse to the terminal M and a negative pulse to the terminal N. The wafer 5 is thus moved step-by-step and stops on each conductive pad as long as is desired. The form given to the conductive pads 100 to 106 has been chosen to favour the centering of the wafer 5 when the movement takes place in the positive direction of the axis OZ. Of course, it is also possible to reverse the direction of movement of the electret wafer 5 by changing over the connections at the level of the terminals M, N and P or by changing the content of the excitation signals. It will further be noted that the device of FIG. 9 lends itself to the combined movement of a number of electret wafers, provided that they are not too close together. The device of FIG. 9 constitutes a true shift register, which can be read by any optical, electrical or other means, as described in the foregoing. In addition, conductive pads may be disposed along a path on each of the support plates 1 and 2. These paths can follow all kinds of trajectories in the plane, and they may criss-cross or form loops.

What we claim is:

1. An electrically controlled switching device comprising a frame of insulator material and at least one movable member; said movable member having in relation with said frame at least two rest positions; said movable member comprising a dielectric body carrying a permanent electric charge; said frame being provided with at least two distinct electrically conductive pads for causing said movable member to be retained by electrostatic influence, in any one of said rest positions; electric bias means being connected to the said conductive pads for causing said movable member to switch across the gap separating said conductive pads.

2. An electrically controlled switching device as claimed in claim 1, wherein said frame comprises two support plates separated by said gap whose width is greater than the thickness of the said movable member; said movable member being a flexing reed interposed between said support plates; said conductive pads being respectively arranged on said support plates for physical-contact with said movable member respectively for each of said rest positions.

3. An electrically controlled switching device as claimed in claim 1, wherein said frame comprises at least one support plate; said conductive pads being situated on said support plate; said movable member being free to slide along said support plate between said conductive pads.

4. An electrically controlled switching device as claimed in claim 2, wherein said flexing reed is clamped to said frame by at least one of its ends.

5. An electrically controlled switching device as claimed in claim 3, wherein said support plate has a sliding plane; said movable member being slidably mounted for sliding in two distinct directions pertaining to said sliding plane.

6. An electrically controlled switching device as claimed in claim 3, wherein said support plate has a sliding plane; said movable member being adapted to pivot about an axis perpendicular to said sliding plane.

7. An electrically controlled switching device as claimed in claim 3, wherein said conductive pads succeed one another in such manner as to form a string having N consecutive rest positions, N being an integer higher than one; said electric bias means being connected to the said pads for shifting said movable member from any one of said rest positions to the next one of said rest positions along said string.

8. An electrically controlled switching device as claimed in claim 1, wherein said electric bias means are pulse generator means.

9. An electrically controlled switching device as claimed in claim 1, wherein said device comprises a matrix arrangement of elemental cells; each one of said elemental cells comprising the movable member associated with the two conductive pads which form row and column electrodes of said matrix arrangement.

10. An electrically controlled switching device as claimed in claim 1, further comprising means for guiding an optical radiation to be switched; said movable member being associated with said means for guiding.

11. An electrically controlled switching device as claimed in claim 1, further comprising means for modifying the characteristics of an incident optical radiation; said movable member being associated with said modifying means.

12. An electrically controlled switching device as claimed in claim 1 further comprising electric means having two state of conduction; said movable member being associated with said electric means.

13. An electrically controlled switching device as claimed in claim 12, wherein said electric means consist of a set of fixed and movable contacts.

14. An electrically controlled switching device as claimed in claim 12, wherein said electric means consist of a field effect solid-state element.

* * * * *